(12) United States Patent
Fox et al.

(10) Patent No.: US 10,731,455 B2
(45) Date of Patent: Aug. 4, 2020

(54) ROTATING SPECTRAL DENSITY TOOL FOR BEHIND PIPE EVALUATION

(71) Applicant: Halliburton Energy Services, Inc., Houston, TX (US)

(72) Inventors: Philip Edmund Fox, Covington, TX (US); Fnu Suparman, Katy, TX (US); Gary James Frisch, Houston, TX (US); Michael Jason Englar, New Orleans, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 324 days.

(21) Appl. No.: 15/565,132

(22) PCT Filed: Dec. 29, 2016

(86) PCT No.: PCT/US2016/069099
§ 371 (c)(1),
(2) Date: Oct. 6, 2017

(87) PCT Pub. No.: WO2018/125114
PCT Pub. Date: Jul. 5, 2018

(65) Prior Publication Data
US 2019/0383130 A1    Dec. 19, 2019

(51) Int. Cl.
*E21B 47/005* (2012.01)
*G01V 1/40* (2006.01)
(Continued)

(52) U.S. Cl.
CPC .............. *E21B 47/005* (2020.05); *G01V 1/40* (2013.01); *G01V 5/107* (2013.01); *G01V 5/125* (2013.01)

(58) Field of Classification Search
CPC .... E21B 47/0005; G01V 5/125; G01V 5/107; G01V 1/40; G01V 11/00
See application file for complete search history.

(56) References Cited

U.S. PATENT DOCUMENTS

| | | |
|---|---|---|
| 5,001,342 A | 3/1991 | Rambow |
| 2011/0284732 A1 | 11/2011 | Korkin et al. |

(Continued)

FOREIGN PATENT DOCUMENTS

| | | |
|---|---|---|
| EP | 0443936 A1 | 8/1991 |
| WO | 2016028537 A1 | 2/2016 |

(Continued)

OTHER PUBLICATIONS

Donovan et al., "Behind Pipe Log Evaluation Study: Deepwater Subsea Abandonments in the Gulf of Mexico," SPE 174777, Sep. 2015.

(Continued)

*Primary Examiner* — David P Porta
*Assistant Examiner* — Meenakshi S Sahu
(74) *Attorney, Agent, or Firm* — John Wustenberg; C. Tumey Law Group PLLC

(57) ABSTRACT

A method includes introducing a tool string into a wellbore having material disposed in an annular region surrounding the casing. Obtaining acoustic refracted waveform measurements of the material from a cement bond logging tool, obtaining ultrasonic measurements of the material from a circumferential acoustic scanning tool, obtaining gamma radiation measurements scattered from the material from a circumferential spectral density logging (RSDX) tool by emitting gamma radiation from a radioactive source in a rotating portion of the RSDX and detecting scattered gamma radiation using near and far spectral density detectors, and obtaining thermal neutron radiation measurements scattered from the material from a dual spaced neutron logging tool. A computer obtains measurements and generates a deliverable that includes one or more cross plots that identify a compositional equivalent of the material in an entire circumference of the wellbore.

21 Claims, 6 Drawing Sheets

(51) Int. Cl.
*G01V 5/10* (2006.01)
*G01V 5/12* (2006.01)

(56) References Cited

U.S. PATENT DOCUMENTS

2014/0034823 A1   2/2014  Hyde-Barber
2016/0202387 A1*  7/2016  Fox ..................... G01V 11/002
                                         73/152.58

FOREIGN PATENT DOCUMENTS

WO    2016040062 A1   3/2016
WO    2016069000 A1   5/2016
WO    2016069002 A1   5/2016

OTHER PUBLICATIONS

International Search Report and Written Opinion for PCT/US2016/069099 dated Sep. 21, 2017.

* cited by examiner

ROTATING SPECTRAL DENSITY TOOL FOR BEHIND PIPE EVALUATION

BACKGROUND

In the oil and gas industry, after drilling a wellbore it is common practice to line the wellbore with one or more strings of pipe known in the industry as "casing," and secure the casing in the wellbore with cement pumped into the wellbore annulus defined between the casing and the wall of the wellbore. In some cases, two or more strings of casing are concentrically positioned in the wellbore and cement is pumped between the casings and the wellbore annulus to secure the casings within the wellbore.

Good cement bonding characterization between the casing and the wellbore, and also the location and distribution of other classes of downhole materials and their characterization, is essential and particularly critical in the case of plug and abandonment operations. For instance, accurately characterizing the materials or substances disposed within the annulus, and determining their azimuthal and depth distributions throughout the wellbore may help an operator determine a preferred location to cut the casing so that upper portions of the casing may be pulled out of the wellbore. More particularly, determining the azimuthal and depth location of particular materials present within the annulus may help determine where the casing is relatively "free" or has little resistance to being extracted (pulled) from the well after being cut. It is also desirable to estimate the forces required to extract cut casing when portions of the casing are covered entirely or in part by solids and/or gelled materials that increase the friction existing between the casing and materials in the annulus. Additionally, it is desirable to estimate the presence of gas and/or lighter fluids that may pose a risk or hazard to operations performed during well intervention and abandonment activities.

Past methods to accomplish this include using data acquired from cement bond logging tools, such as omni-directional or sectored/segmented logging tools, ultrasonic measurement tools, and pad-mounted spectral density logging tools. Like the sectored/segmented cement bond logging tools, the pad-mounted spectral density logging tools acquire data only from a sector of the wellbore and do not acquire data from the entire circumference of the wellbore. Further, in deviated wellbores, the pad-mounted spectral density logging tools may only acquire data only from the lower side of the wellbore since the weighted measurement pad may become oriented in the downward direction due to gravity. It is therefore difficult to accurately determine the presence of certain substances, such as settled drilling fluid ("mud") solids, in the wellbore annulus and in between the casings and thereby differentiate these substances from the cement present in the wellbore annulus and in between the casings.

Over a period of years from the initial completion of the well to the time of well abandonment, drilling fluids left in place in the wellbore annulus deteriorate and precipitate the suspended weighting materials, which often accumulate between concentric or overlapping layers of casing. These solids can act as a binding agent that makes it harder to extract cut casing above a cutting depth.

By relying on legacy acoustic and spectral density measurements, the identification of such solids is often partially inaccurate. This is because acoustic sensor readings for such solids fail to provide significant contrast to adjacent materials present in the wellbore annulus at a suitable level sufficient for identification purposes. This often results in the incorrect determination of the character of materials within the annulus and, therefore, a resulting miscalculation of optimal or feasible cutting forces required to extract the casing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
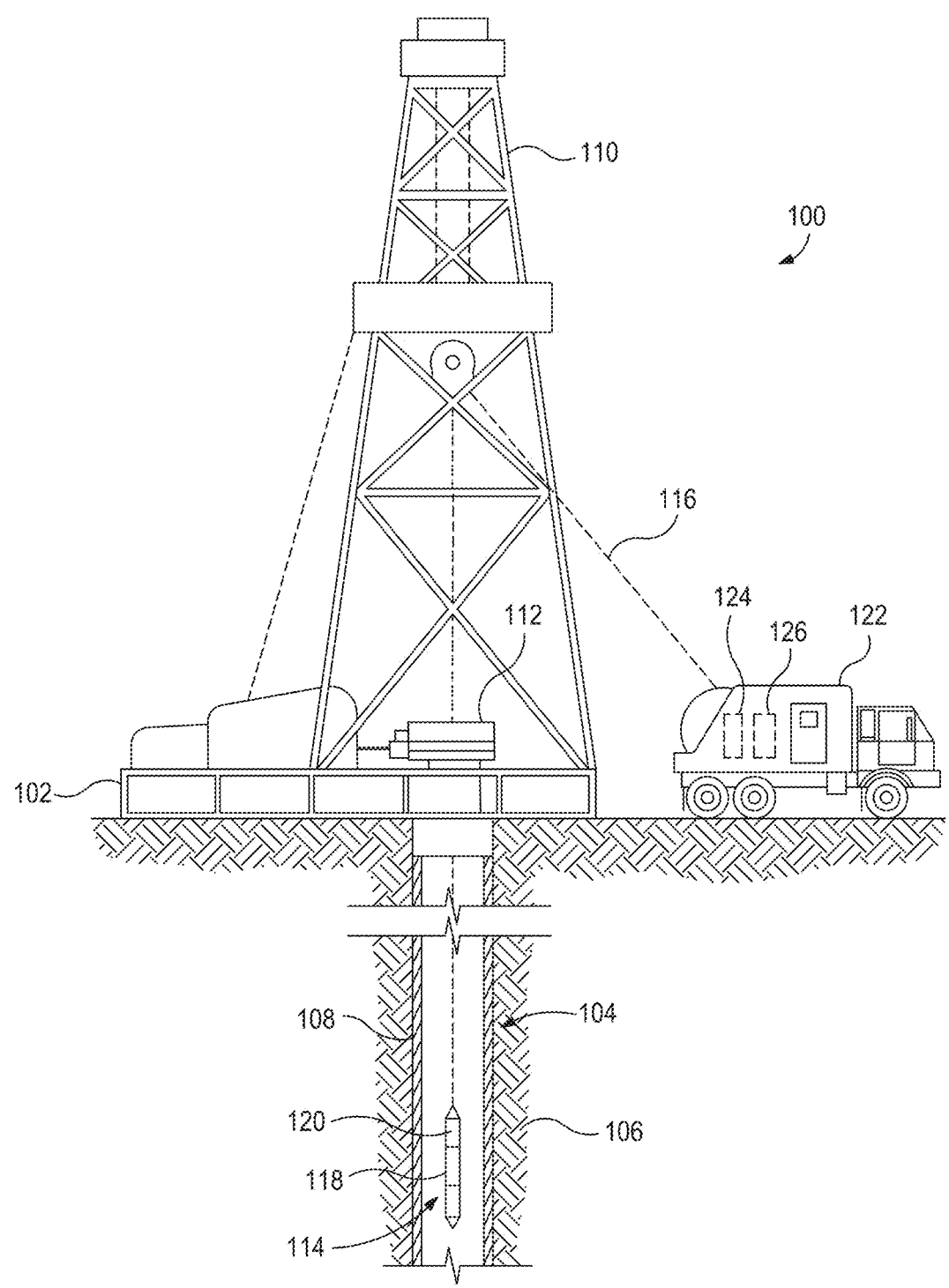
FIG. 1 is a schematic diagram of an example wellbore logging system that may employ the principles of the present disclosure.

Embodiments disclosed are directed to downhole tools and methods of operation thereof for improved wellbore intervention operations for the oil and gas industry and, more particularly, to circumferential spectral density logging tools for characterizing materials disposed within an annular region surrounding a casing that lines a wellbore, and thereby providing an improved evaluation of bond integrity between the casing and a bonding material filling the annular region for securing the casing within the wellbore.

The circumferential spectral density logging tools provide a more robust description or characterization of materials within the annular region by providing a complete circumferential coverage around the wellbore using a radioactive source and measurement detectors positioned in a rotating mechanism, unlike the legacy unidirectional pad-mounted spectral density logging tools presently used throughout the industry. The circumferential spectral density logging tools advantageously measure in all directions around the circumference of the wellbore to compliment associated sensor responses and develop a circumferential mapping of the entire wellbore. The measurements obtained from the circumferential spectral density logging tools also allow phase description distinguishing between solid, liquid, settled mud solids (i.e., barite) and gas components, if present. The methods described herein may prove advantageous in providing a more accurate characterization of the annular region and a prediction of cutting depth estimated from a historically optimized model based on previous log measurements and modeled applied rig tension profiling. As will be appreciated, this may allow a well operator to better plan rig operations and manage expenses and forecasting activities.

The density measurements from the circumferential spectral density tools are added to the legacy acoustic, ultrasonic, and neutron measurements and data interpretation to characterize the materials disposed within the annular region. Based on the material(s) present in the annular region, the depth at which the wellbore casing can be cut for extraction can be determined.

In addition, when used in an open hole environment, the measurement obtained using the circumferential spectral density tools helps to better evaluate the variation in the rock formation properties and elemental distributions in the formation. These open hole measurements can be used to quantify the bulk density of the formation in gram/cc units and the lithology in barn/electron units. In addition to rotating the detectors, the gap (i.e., the standoff distance) between the radioactive source and the inner wall of the wellbore, the axial separation between the far and near detectors of the circumferential spectral density logging tool, and the gap between the far and near detectors and the inner wall of the wellbore can be adjusted to vary the depth of investigation and acquire additional wellbore data. As a result, identification of formation features, such as fractures, faults, vugs, dipping beds, and the like, is possible.

As used herein, the term "annular region" or variations thereof refers to an annulus defined between the casing and the wellbore or one or more annuli defined between one or more overlapping (e.g., concentric) casings.

FIG. 1 is a schematic diagram of an example wellbore logging system 100 that may employ the principles of the present disclosure, according to one or more embodiments. As illustrated, the wellbore logging system 100 may include a surface platform 102 positioned at the earth's surface and a wellbore 104 that extends from the surface platform 102 into one or more subterranean formations 106. In other embodiments, such as in offshore operations, a volume of water may separate the surface platform 102 and the wellbore 104. The wellbore 104 may be lined with one or more strings of casing 108 (one shown) and secured in place with a bonding material, such as cement. In some embodiments, portions of the wellbore 104 may have only one casing 108 secured therein, but other portions of the wellbore 104 may be lined with two or more strings of casing 108 that overlap each other (e.g., concentric casings) at least a short distance and are secured in the wellbore 104 via cement filling the annuli between overlapping strings of casing 108. The casings 108 may be made of plain carbon steel, stainless steel, or another material capable of withstanding a variety of forces, such as collapse, burst, and tensile failure.

A derrick 110 is supported by the surface platform 102 and a wellhead installation 112 is positioned at the top of the wellbore 104. A tool string 114 (alternatively referred to as a "sonde") may be suspended into the wellbore 104 on a conveyance 116 such as, but not limited to, wireline, slickline, an electric line, coiled tubing, drill pipe, production tubing, a downhole tractor, or any combination thereof.

The tool string 114 may include multiple sensors or logging tools 118 used to analyze the bond integrity between the casing 108 and the cement (or another bonding material) that bonds the casing 108 to the wellbore 104. More particularly, the logging tools 118 may be configured to detect the presence and the circumferential distribution of gases, liquids, settled mud solids (i.e. barite), cement, or any combination of the foregoing materials at any depth in the wellbore 104 at the interface between the casing 108 and the cement. The logging tools 118 may include, but are not limited to, a cement bond logging tool, a circumferential acoustic scanning tool, a circumferential spectral density logging tool, and a dual spaced neutron logging tool. Those skilled in the art will readily appreciate that the logging tools 118 may be expanded to include other known sensors, or those developed in the future with suitable application, without departing from the scope of the disclosure.

The tool string 114 may also include a communication module 120 having an uplink communication device, a downlink communication device, a data transmitter, and a data receiver. The conveyance 116 may include electrical conductors to provide power to the logging tools 118 and communicably couple the logging tools 118 to a logging facility 122 situated at a surface location. Alternatively, in other embodiments, the logging tools 118 may be powered via a downhole power source, such as a battery, fuel cells, a downhole power generation mechanism, or the like included in the tool string 114. In yet other embodiments, an electrical cable may be introduced into the wellbore 104 for transmitting power to the logging tools 118. In the illustrated embodiment, the logging facility 122 is depicted as a truck, but could alternatively be another type of computing facility commonly used in the art. The logging facility 122 may include a surface communication module 124 and a surface computer 126. The surface communication module 124 may include an uplink communication device, a downlink communication device, a data transmitter, and a data receiver. The surface computer 126 may comprise any suitable type of processing logic and may include a logging display and one or more recording devices. The surface computer 126 comprises processing logic (e.g., one or more processors) and has access to software (e.g., stored on any suitable computer-readable medium housed within or coupled to the computer 126) and/or input interfaces that enable the computer 126 to perform, assisted or unassisted, one or more of the methods and techniques described herein. In operation, the logging facility 122 may collect measurements from the logging tools 118 via the communication modules 120, 124, and the surface computer 126 may control, process, store, and/or visualize the measurements gathered by the logging tools 118. The computer 126 can include processing logic (e.g., one or more processors) configured to execute one or more sequences of instructions or programming code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. Common forms of a non-transitory, computer-readable media can include, for example, floppy disks, flexible disks, hard disks, magnetic tapes, other like magnetic media, CD-ROMs, DVDs, other like optical media, punch cards, paper tapes and like physical media with patterned holes, random access memory (RAM) devices, read only memory (ROM) devices RAM, and semiconductor memory devices (e.g., EPROM, EEPROM, flash memory devices).

In some embodiments, processing logic and storage media may be disposed downhole within the tool string 114 and may be used either in lieu of the surface computer 126 or in addition thereto. In such embodiments, storage media housed within the tool string 114 may store data (such as that obtained from the logging operations described herein), which may be downloaded and processed using the surface computer 126 or other suitable processing logic once the tool string 114 has been raised to the surface. In some embodiments, processing logic housed within the tool string 114 may process at least some of the data stored in the storage media within the tool string 114 before the tool string 114 is raised to the surface.

Figure 2:
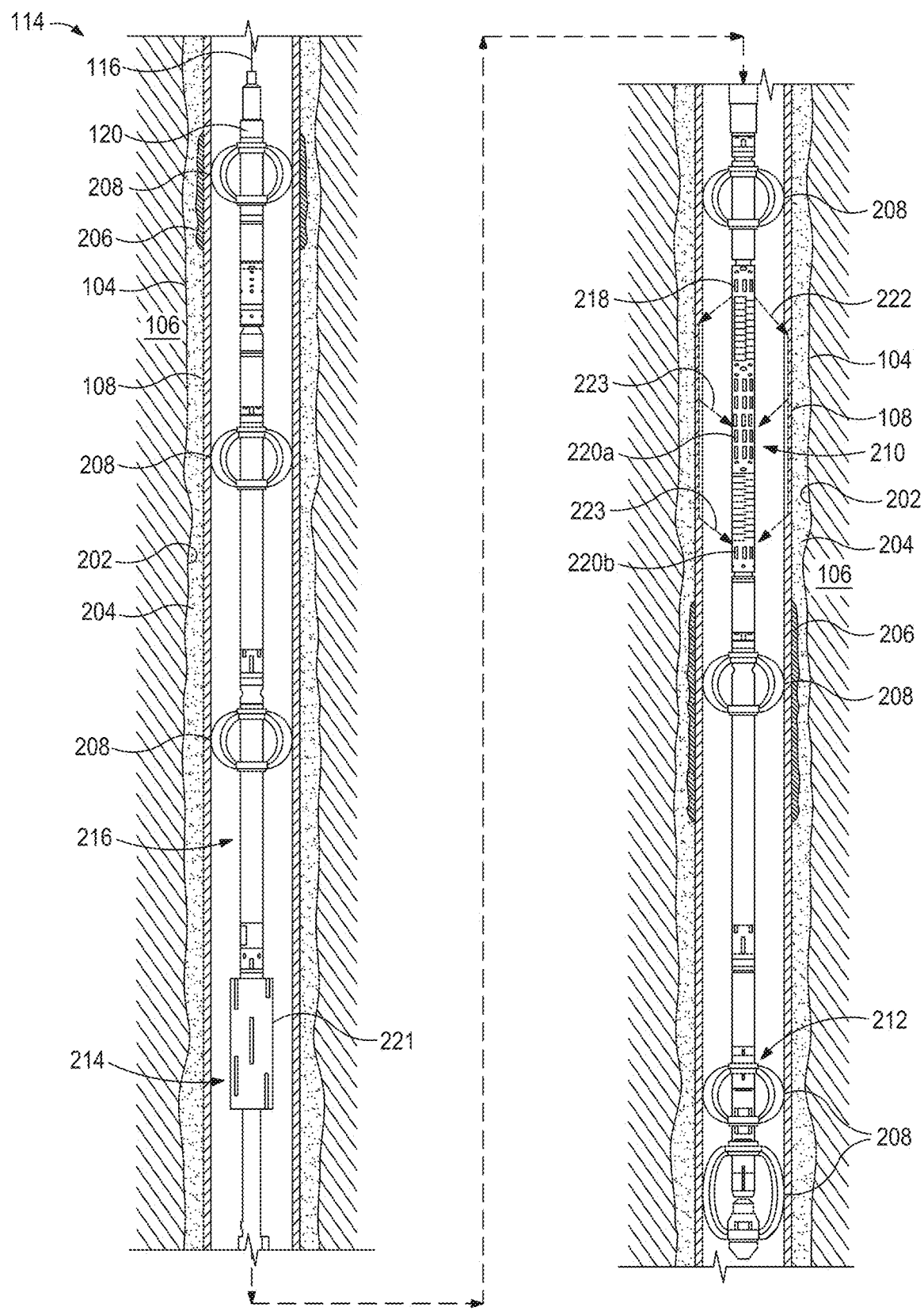
FIG. 2 depicts an enlarged view of an example embodiment of the tool string of FIG. 1.

FIG. 2 depicts an enlarged view of an example embodiment of the tool string 114 of FIG. 1. As illustrated, the tool string 114 is conveyed on the conveyance 116 into the wellbore 104, which penetrates the surrounding subterranean formation 106 and is lined with the casing 108. An annular region, e.g., annulus 202, is defined between the casing 108 and the wall of the wellbore 104 and may be filled with cement 204 and/or other materials that secure or bond the casing 108 within the wellbore 104. Although not explicitly illustrated, more than one string of casing 108 may be secured within the wellbore 104, such as two or more strings of casing 108 that overlap each other or are otherwise concentrically positioned.

Along most portions of the wellbore 104, the casing 108 may be properly bonded to the formation 106 via cement 204 or other materials that fill the interface between the casing 108 and the formation 106. In some locations, however, the bond between the casing 108 and the cement 204 (or other materials) may be poor or may fail over time and it may be desired to analyze material 206 disposed within the annulus 202 to determine whether or not the bond between the casing 108 and the cement 204 remains intact. According to embodiments disclosed, the logging tools 118 (FIG. 1) included in the tool string 114 may be used to determine a compositional equivalent for the material 206 disposed in the annulus 202 and thereby determine axial locations along the wellbore 104 where the casing 108 may or may not be properly bonded to the cement 204 or other materials. Although the embodiments are described with respect to determining the compositional equivalent for the material 206 disposed in the annulus 202, the embodiments are not limited thereto. The disclosed embodiments are equally applicable in determining the compositional equivalent for material disposed in the annuli between overlapping strings of casing, without departing from the scope of the disclosure.

As used herein, the term "compositional equivalent" refers a category to which the material 206 can be assigned and can include gases, liquids, settled mud solids (i.e. barite), or cement. Accordingly, while depicted in FIG. 2 as separate from the cement 204, in some cases, the material 206 may comprise a portion of the cement 204, thereby indicating that the bond between the casing 108 and the cement 204 remains intact. If, however, the compositional equivalent of the material 206 is one of gases, liquids, or settled mud solids, it may be ascertained that the bond between the casing 108 and the cement 204 has failed at that location. Likewise, materials other than the cement 204 may have accumulated in intervals previously not isolated by the cement 204 or in un-bonded portions of the annulus 202. This may create bonded intervals beyond the originally cemented portions of the well.

As the tool string 114 traverses the wellbore 104, one or more centralizers 208 may operate to centralize the tool string 114 within the wellbore 104. The centralizers 208 may comprise, for example, leaf spring or bow spring centralizers, but could alternatively be any other type of downhole tool centralizing device.

As mentioned above, the tool string 114 may include a plurality of logging tools 118 (FIG. 1), which may include, but are not limited to, a cement bond logging tool 210, a circumferential acoustic scanning tool 212, and at least two nuclear tools shown as a circumferential spectral density logging tool 214 and a dual spaced neutron tool 216. During operation within the wellbore 104, each of the logging tools 210, 212, 214, 216 may be configured to obtain measurements that help determine the compositional equivalent for the material 206, whether it be cement 204 or one of gases, liquids, settled mud solids, or any combination of thereof.

As also mentioned above, the logging tools 118 (e.g., tools 210, 212, 214, 216) may be expanded to include one or more other logging tools including sensors (and the corresponding sources) for determining the compositional equivalent for the material 206. These sensors may include, but are not limited to, ultrasonic transducers including a single sensor or an array of multiple sensors, spectral gamma ray sensors such as sensors for detecting radioactive tracers, pulsed neutron sensors for conducting circumferential measurement such as inelastic-C/O measurements of gadolinium used for gravel pack evaluation, an epithermal neutron sensor, a rotating gamma-density sensor, an advanced acoustic logging tool with multiple excitation abilities (monopole, dipole, quadrapole, multi-pole), elemental capture gamma ray sensors or the like, without departing from the scope of the disclosure.

The cement bond logging tool 210 may comprise an omni-directional and sectored/segmented logging tool configured to provide acoustic refracted waveform measurements. In some embodiments, the cement bond logging tool 210 may operate as a pitch-and-catch transducer. More particularly, the cement bond logging tool 210 may include a source transmitter 218 and two or more detectors 220a and 220b, which may be arranged in a pitch and catch configuration. That is, the source transmitter 218 may act as a pitch transducer, and the detectors 220a,b may act as near and far catch transducers spaced at suitable near and far axial distances from the source transmitter 218, respectively. In such a configuration, the source transmitter 218 emits sonic or ultrasonic waves 222 while the near and far detectors 220a,b receive acoustic refracted waveforms 223 after reflection from fluid in the wellbore 104, the casing 108, the cement 204 (or other annular contents), and the formation 106 and record the received waveforms 223 as time domain waveforms. Because the distance between the near and far detectors 220a,b is known, differences between the refracted waveforms 223 received at each detector 220a,b provides information about attenuation that can be correlated to the material 206 in the annulus 202, and they allow a circumferential depth of investigation around the wellbore 104.

The pitch-catch transducer pairing may have different frequency, spacing, and/or angular orientations based on environmental effects and/or tool design. For example, if the source transmitter 218 and the detectors 220a and 220b operate in the sonic range, spacing that ranges from three to fifteen feet may be appropriate. If, however, the source transmitter 218 and the detectors 220a and 220b operate in the ultrasonic range, the spacing may be reduced.

In addition or as an alternative to the pitch-and-catch configuration of the source transmitter 218 and the detectors 220a and 220b, the cement bond logging tool 210 may also include a pulsed echo ultrasonic transducer (not expressly shown). The pulsed echo ultrasonic transducer may, for instance, operate at a frequency from 80 kHz up to 800 kHz. The optimal transducer frequency is a function of the casing 108 size, weight, mud environment and other conditions. The pulsed echo ultrasonic transducer transmits waves, receives the same waves after they reflect off the casing 108, materials in the annulus 202, and the formation 106, and records the waves as time-domain waveforms.

The use of sonic, pulsed echo ultrasonic, and pitch and catch waveforms have historically been used to evaluate the annulus 202 for the presence of cement 204 (a cement sheath) or a lack thereof The sonic waveforms 222 use the amplitude of the first arrival, attenuation of the refracted waveforms 223 using multiple the near and far detectors 220a,b, and a recorded waveform to determine the amount of cement 204. The pulsed echo ultrasonic and pitch and catch waveforms are processed using various methods to determine the impedance of the materials in the annulus 202, and evaluation of the impedance data may be used to help determine the distribution and compositional equivalent of the material 206 over the circumferential exterior surface of the casing 108 within the annulus 202. It will be appreciated, however, that evaluating the material 206 may not be limited to the above-described methods, but may alternatively include other proprietary techniques based on tool design and methodology.

The standard sonic, pulsed echo ultrasonic, and pitch and catch waveforms may be processed by referencing the peaks and troughs of the waveforms to help characterize the material 206 in the annulus 202. Such processing and analysis may be performed using techniques such as Peak Analysis for Cement Evaluation (PACE) and PACE for segmented radial bond tools (PACERS). Waveforms have a completely different signature when the annulus 202 is filled with a fluid (i.e., free pipe or casing 108) or a solid (i.e., cement 204), and variations associated with other materials, such as drilling muds and settled mud solids. The free pipe signature, for instance, generally exhibits higher amplitudes, a low rate of attenuation and a consistent waveform response. When the annulus 202 is filled with a solid material, however, such as the cement 204, the amplitude of the waveform is reduced, the attenuation of the same waveform is increased, and the waveforms are not consistent. PACE and PACERS evaluate the peaks and troughs of these waveforms using a standard methodology for various acoustic measurement systems with different types of waveforms.

More specifically, this new technique uses the peaks and troughs of the waveform for analysis and a derivative process is subsequently used to determine the peaks and troughs. Locations where the derivative changes sign corresponds to the peak or trough of that waveform, and the value of the waveform will be called a peak. This provides an automatic method of picking both the positive and negative peaks of the entire waveform. The next step is to take the absolute value of each peak. At that point, it is possible to start seeing some general trends in the data of each waveform, and various groupings or sections appear. It is also possible to stack these waveforms to highlight these groupings.

Using the above sequence of steps, various patterns begin to emerge from both the free and bonded sections of the wellbore 104. There are four or more distinct areas (regions) or breaks in the waveform response and can be sorted or studied based on these breaks. Each area or break can be adjusted or shifted based on the waveform response, casing size, casing weight, cement properties, and other environmental conditions of the well.

It is apparent that the first region is the casing 108 arrivals, while the fifth region constitutes arrivals derived from the formation 106. The other regions encompass the area between the casing 108 and the formation 106 (i.e., the annulus 202). The second and fourth regions, for example, appear to be influenced by the casing 108 and the formation 106, respectively, and can be analyzed at a future time. The third region may also be influenced by the surrounding regions, but by what effect is not necessarily clear. This grouping of regions may be a function of environmental and tool conditions, but has been recognized by both the standard cement bond log and the radial bond cement bond log, which operate at different frequencies.

Once the regions are selected, the area under each waveform for each region is determined. The area of the first region is calculated without using the first positive peak. This is due to the fact that the first positive peak is always smaller than subsequent peaks, and so removing this naturally low peak allows easier comparison to the other areas. These areas are then normalized to 100% free pipe and color-coded to allow easier viewing. This is somewhat similar to using the amplitude of waveforms to determine bonding, but multiple peaks are used instead of using a single cycle.

The circumferential acoustic scanning tool 212 may obtain ultrasonic measurements of the material 206 by using a rotating transducer to emit high-frequency acoustic pulses that are reflected from fluid in the wellbore 104, the casing 108, the cement 204 (or other annular contents), and the formation 106. The transducer senses the reflected pulses, and an associated logging system measures and records reflected pulse amplitude and two-way travel time. These data can be processed to produce detailed visual images of the casing 108, the cement 204 (or other annular contents), and beyond. Suitable tools that may be used as the circumferential acoustic scanning tool 212 include, but are not limited to, the line of circumferential acoustic scanning tools (CAST) currently available from Halliburton Energy Services of Houston, Tex. (e.g., CAST-I™, CAST-V™, CAST-M™, CAST-XR™, FASTCAST™, etc.).

The circumferential spectral density logging tool 214 may comprise a type of nuclear logging tool. In some embodiments, as illustrated, the circumferential spectral density logging tool 214 may include a rotating portion 221 that may include a radioactive source and measurement detectors. In an example, the rotating portion 221 may be a scanning head on which the radioactive source and measurement detectors are mounted. The rotating portion 221 is centered in the wellbore 104, and thus the casing 108, using the centralizers 208 and may be rotated to perform measurements in the wellbore 104. However, in other examples, the rotating portion 221 may be a stationary housing and the radioactive source and measurement detectors may be mounted on a rotating assembly included within the rotating portion 221. In such examples, the rotating portion 221 may define one or more "windows" to permit gamma radiation emitted by the radioactive source to exit the rotating portion 221 and the scattered gamma radiation to be detected by the measurement detectors.

The circumferential spectral density logging tool 214 may be configured to adjust the standoff distance between the radioactive source and the inner wall of the wellbore 104. Additionally, the circumferential spectral density logging tool 214 may also be configured to adjust the standoff distance between the measurement detectors and the inner wall of the wellbore 104, and the axial separation between the measurement detectors. By adjusting the standoff distances and the axial separation of the radioactive source and the measurement detectors, the depth of investigation may be varied for obtaining measurements. Although not expressly illustrated, the circumferential spectral density logging tool 214 may include the necessary instrumentation and electronics (e.g., motors, gears, control circuitry, etc.) to control the operation of the rotating portion 221 and to adjust the standoff distances and the axial separation of the radioactive source and the measurement detectors. As will be appreciated, this radial and axial variations in the positions of the radioactive and measurement detectors accommodates for variation on wellbore condition including, but not limited to, wellbore contents (muds, brines, production fluids, etc.), casing sizes, casing material, casing thickness, annular contents between overlapping casings and between casing and wellbore, spacing between multiple concentric casings and the formation. Accordingly, the circumferential spectral density logging tool 214 provides for multiple depths of investigation that may be performed in a rotating manner to provide a complete circumferential coverage of the wellbore 104.

Figure 3A:
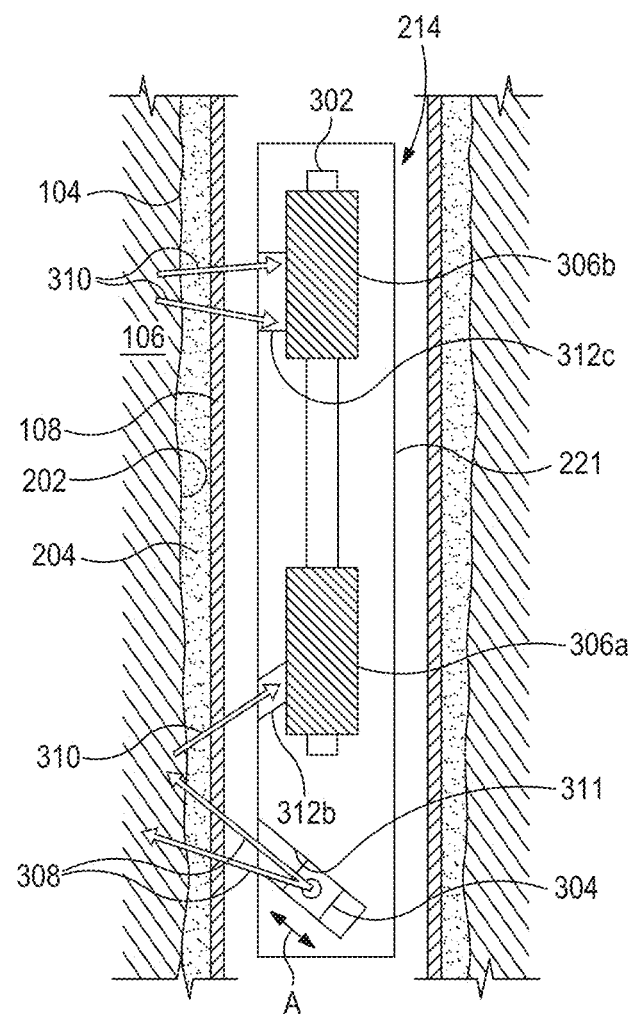
FIGS. 3A and 3B are schematic side-views of example embodiments of the circumferential spectral density logging tool and the dual spaced neutron tool, respectively, of FIG. 2.

FIG. 3A depicts a schematic side-view of an example embodiment of the rotating portion 221 of the circumferential spectral density logging tool 214 as arranged within the wellbore 104. In an example, an objective measurement of the materials within the annulus 202 can be achieved by controlling the standoff distance between a radioactive source 304 and the inner wall of the casing 108, by controlling a rotation of the rotating portion 221, and by varying the axial separation between spectral density detectors 306a,b (explained below) contained in the rotating portion 221.

The rotating portion 221 may contain the radioactive source 304, a near spectral density detector 306a, and a far spectral density detector 306b axially spaced from each other within the rotating portion 221 such that the near spectral density detector 306a axially interposes the radioactive source 304 and the far spectral density detector 306b. Although FIG. 3A illustrates the circumferential spectral density logging tool 214 including one radioactive source 304 and two detectors 306a,b, more than one radioactive source and more than two detectors may be used, without departing from the scope of the disclosure. The radioactive source 304, which may comprise cesium-137 (Cs-137), emits gamma rays 308 toward the casing 108 (more than one casing 108 may be present), the cement 204 (or other annular contents), and the formation 106 to determine near and far detector count rates in various portions of the measured spectrum and can thereby derive bulk density and photoelectric absorption of materials in its path. The near and far spectral density detectors 306a,b are configured to detect gamma radiation 310 scattered back from the casing 108, the materials within the annulus 202 (e.g., the material 206 of FIG. 2), and the formation 106. The near and far spectral density detectors 306a,b may be coupled to a driving mechanism (e.g., an electro-mechanical driving system 302) for axially varying the positions of the near and far spectral density detectors 306a,b relative to each other and/or relative to the radioactive source 304. In addition, the standoff distance between the inner wall of the wellbore 104 and the near and far spectral density detectors 306a,b may also be varied using the driving mechanism 302 or another, separate driving mechanism (not expressly illustrated). Thus, with respect to the wellbore axis in FIG. 3A, the near and far spectral density detectors 306a,b may be movable in the axial and radial directions.

Detection of the gamma radiation 310 may be by way of measuring a count rate of photons as a function of energy. As the gamma rays 308 travel from the radioactive source 304, they are attenuated by the structures and materials in their paths and reach the near and far spectral density detectors 306a,b as gamma radiation 310. The attenuation is a function of the electron densities as well as the photoelectric absorption properties of those structures and materials. Real-time analysis of the energy spectrum of the detected gamma radiation 310 may reveal bulk density and photoelectric absorption of the casing 108, the materials within the annulus 202 (e.g., the material 206 of FIG. 2), and the formation 106. The near and far spectral density detectors 306a,b may be calibrated to detect the complete spectrum of gamma radiation 310, but can also be calibrated to detect the gamma radiation 310 having energies within a fixed, predetermined window similar to the existing density logging tools. Because of the full spectrum acquisition of gamma radiation 310, advanced spectral processing techniques can be performed to provide result in detailed composition evaluation of formation volumes outside the casing 108, or, in case of overlapping casing, of wellbore volumes outside the innermost casing. In an embodiment, the circumferential spectral density logging tool 214 may include a plurality of radioactive sources 304 and the gamma radiation 310 may be measured with a single spectral density detector 306 or an array of multiple spectral density detectors 306.

As illustrated, the radioactive source 304 may be located in a cavity 311 defined in the rotating portion 221 and a position of the radioactive source 304 in the cavity 311 may be variable. For instance, the radioactive source 304 may be moved back and forth (indicated by the arrow A) in the cavity 311 using a drive mechanism (not illustrated). By varying the position of the radioactive source 304, the standoff distance between the radioactive source 304 and the inner wall of the wellbore 104 may be varied. In some embodiments, the cavity 311 may function as a collimator to direct the emitted gamma rays 308 in a preferred path. The near and far spectral density detectors 306a,b may each be coupled to respective collimators 312a and 312b for narrowing the gamma radiation 310 being detected. The collimators 312a,b may be coupled to the respective near and far spectral density detectors 306a,b such that the collimators 312a,b also move when the position of the respective near and far spectral density detectors 306a,b is varied. Each of the collimators 312a,b are optional components of the circumferential spectral density logging tool 214.

Figure 3B:
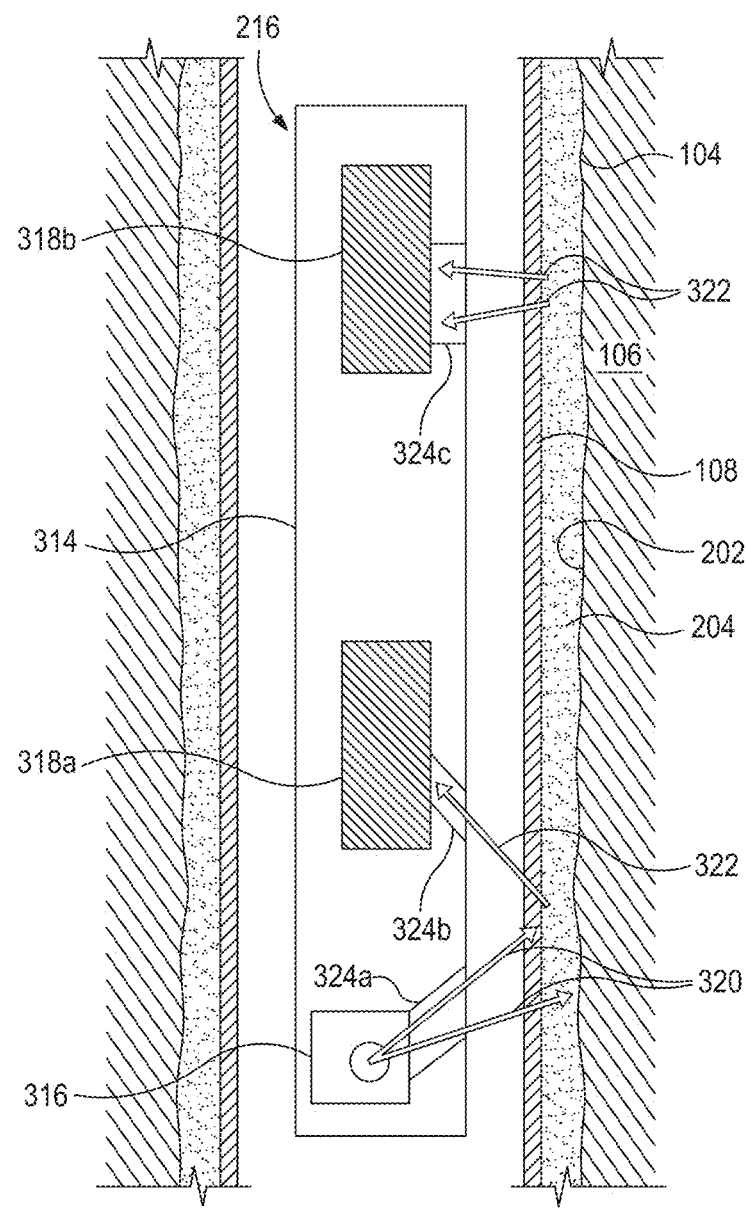

FIG. 3B depicts a schematic side-view of an example embodiment of the dual spaced neutron tool 216 of FIG. 2 as arranged within the wellbore 104. The dual spaced neutron tool 216 may also achieve an objective measurement of the materials within the annulus 202 by controlling the gap (i.e., standoff distance) between the face of the dual spaced neutron tool 216 and the inner wall of the casing 108. Similar to the circumferential spectral density logging tool 214, the dual spaced neutron tool 216 may also comprise a type of nuclear logging tool. As illustrated, the dual spaced neutron tool 216 may include a housing 314 that contains a radioactive source 316, a near neutron detector 318a, and a far neutron detector 318b axially spaced from each other within the housing 314 such that the near neutron detector 318a axially interposes the radioactive source 316 and the far neutron detector 318b. In an example, an array of multiple neutron detectors may be used instead of the near neutron detector 318a and the far neutron detector 318b. The radioactive source 316, such as americium-beryllium (AmBe), bombards the casing 108 (more than one casing may be present), the cement 204 and any other materials contained in the annulus 202, and the formation 106 with fast neutrons 320. Fast neutrons 320 may refer to AmBe source burst neutrons with energy of 4.6 MeV. Collisions with elements in the path of the fast neutrons 320, most notably hydrogen, reduce the energy of the fast neutrons 320 to the thermal level, thereby resulting in thermal neutron radiation 322. The intensity of the thermal neutron radiation 322 may be measured by the near and far neutron detectors 318a,b.

The measurement obtained by the dual spaced neutron tool 216 consists of the calibrated ratio of count rates between the far and near neutron detectors 318a,b (or, the array of multiple detectors, when used). The count rate ratio is related to the hydrogen content in the materials penetrated by the fast neutrons 320, such as the materials 206 (FIG. 2) present within the annulus 202. When hydrogen is associated with liquid-filled pore space in the annulus 202, this ratio can be used to determine porosity, and when combined with other porosity measurements, neutron porosity can be used to detect the presence of formation gas and identify lithology.

In some embodiments, the radioactive source 316 and the near and far neutron detectors 318a,b (or, the array of multiple detectors, when used) may each be coupled to collimators 324 (shown as collimators 324a, 324b, and 324c). The first collimator 324a coupled to the radioactive source 316 directs the emitted fast neutrons 320 in a preferred path, and the second and third collimators 324b,c coupled to the near and far neutron detectors 318a,b, respectively, narrow the thermal neutron radiation 322 being detected. Each of the collimators 324a-c are optional components of the dual spaced neutron tool 216.

The methods and analyses presented herein may use response ratios of gamma ray counts obtained from far detector to the gamma ray counts obtained from the near detector in a desired energy window obtained using the circumferential spectral density logging tool 214 and the dual spaced neutron tool 216. Based on the response ratios, cross plots and continuous depth-based log presentations may be generated, which may that may be then analyzed in determining the compositional equivalent for the material 206 (FIG. 2). As described above, compositional equivalents may be categorized compositions or substances similar to the material 206, and may include, but are not limited to, gases, liquids, settled mud solids, or the cement 204. If the analysis described herein indicates that the material 206 is settled mud solids, for example, that may be an indication that the material 206 comprises drilling fluid weighted with barite, or alternatively drilling fluid weighted with another weighting agent, such as hematite, calcium carbonate, ilmenite, sand, etc. Accordingly, the compositional equivalent does not positively identify an exact composition of the material 206, but rather identifies the material 206 based on a general type or category of composition, for example, as being barite or a cement, or based on the phase composition, such as being a solid, liquid or gas.

Examples of the material 206 that may be categorized as a gas compositional equivalent may include, but are not limited to, air, natural gas, and the like. Examples of the material 206 that may be categorized as a liquid compositional equivalent may include, but are not limited to, water, brines, an emulsion, oil, an alkane, an olefin, an aromatic organic compound, a cyclic alkane, a paraffin, a diesel fluid, a mineral oil, a desulfurized hydrogenated kerosene, oil-base mud, water-base mud, and the like.

As will be appreciated, identifying the compositional equivalent of the material 206 may help a well operator determine a preferred location where the casing 108 might be cut to minimize friction during a cut and pull operation involving the casing 108. At the top of the cement 204 there are generally layers of cement, settled mud solids, liquids, and gases. Accordingly, the cutting depth is preferably as close to the top of cement 204 as possible so that the maximum length of the casing 108 can be recovered while minimizing frictional forces caused by bonds between the casing 108, the cement 204 and other materials disposed behind the casing 108 within the annulus 202. The analyses and methods described herein for identifying the compositional equivalent of the material 206 may provide a better estimation of the cutting depth to enhance the efficacy and efficiency of cut and pull operations.

In some embodiments, the raw count rates for the near and far spectral density detectors 306a,b and the near and far neutron detectors 318a,b may be used in identifying the compositional equivalent of the material 206. In other embodiments, however, the near and far spectral density detectors 306a,b and the near and far neutron detectors 318a,b may be calibrated against a common standard to obtain calibrated count rates. Since every logging tool is slightly different and every radioactive source exhibits a different strength, un-calibrated tools will result in different readings from each logging tool. Additionally, there can be detector efficiencies that differ from one logging instrument to another.

For instance, there are differences in the radioactive sources 304, 316 (FIGS. 3A-3B) used in the circumferential spectral density logging tool 214 (e.g., Cs-137) and the dual spaced neutron tool 216 (e.g., AmBe) as used on different log acquisitions and at individual well locations where these services are being conducted. Calibrating the count rates of the near and far spectral density detectors 306a,b and the near and far neutron detectors 318a,b, however, provides a uniform baseline for comparison between surveys and allows a more uniform focus on the environmental conditions of the wellbore 104 (FIGS. 2 and 3A-3B) and a characterization of the material 206, including its phase. Calibrating the count rates makes all detection rates uniform, even though different radioactive sources 304, 316 may be used.

Embodiments of the present disclosure may utilize calibrated near and far spectral density detector 306a,b count rates as well as calibrated near and far neutron detector 318a,b count rates and ratios of same in various forms. This enhancement allows a normalization and equal comparison of all logging tools of a particular design to be compared on a similar basis, as well providing consistent results between different generations of logging tools and variable radioactive source strengths and detector efficiencies. Such embodiments differ from previous density measurement methods, which commonly rely on the industry standard bulk density (RHOB) based on raw count rates for the near and far spectral density detectors 306a,b. Such embodiments also differ from previous neutron measurement methods, which commonly rely on the industry standard neutron porosity (NPHI) based on raw count rates for the near and far neutron detectors 318a,b. Accordingly, using calibrated counts may prove advantageous in generalizing responses, which are not dependent on tool model or advancement of similar tools.

Figure 4A:
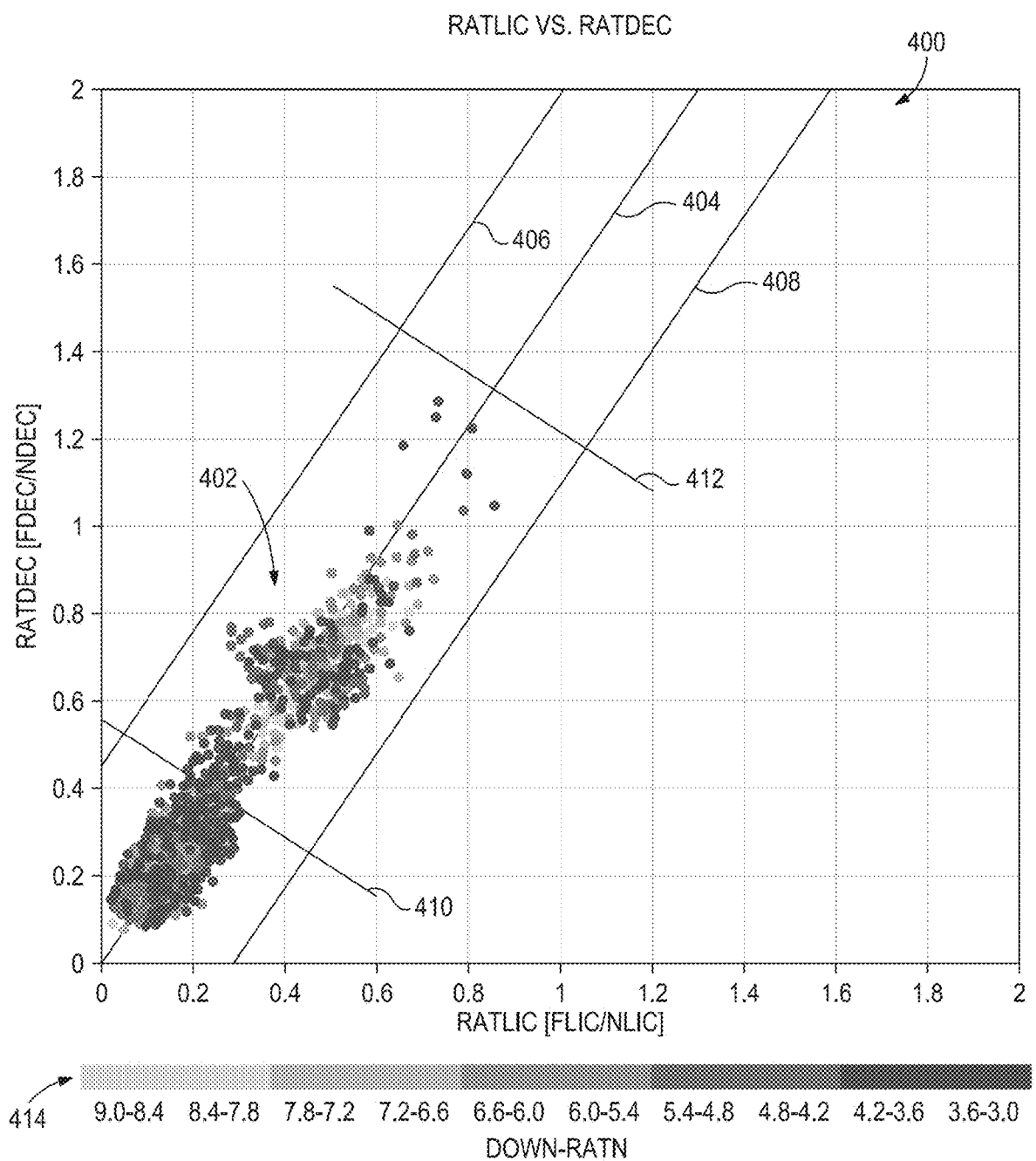
FIG. 4A is an example 2-dimensional (2-D) cross plot depicting a density ratio RATDE (far to near calibrated density window count rates) and a lithology ratio RATLI (far to near calibrated lithology window count rates) for responses obtained by a pad-mounted spectral density logging tool.

FIG. 4A is an example 2-dimensional (2-D) cross plot 400 depicting a density ratio RATDE v. a lithology ratio RATLI for responses obtained by a pad-mounted spectral density logging tool. The density ratio RATDE is a ratio of the calibrated counts for a near spectral density detector (NDE) and a far spectral density detector (FDE) of the pad-mounted spectral density logging tool grouped into clusters by photoelectric response characteristics. The lithology ratio RATLI is a ratio of the calibrated counts for the near spectral density detector (NLI) and far spectral density detector (FLI) grouped into clusters by lithology response characteristics. The abscissa of the cross plot 400 provides the lithology ratio RATLI=FLI/NLI on a scale from 0.0 to 2.0, and the ordinate provides the density ratio RATDE=FDE/NDE also on a scale from 0.0 to 2.0.

The cross plot 400 provides a plurality of clustered density and lithology responses 402 from the near and far spectral density detectors with a desired ratio scaling of far to near counts. The responses 402 may result from the pad-mounted spectral density logging tools measuring the ratio of the atomic weight (Z) to the atomic number (A) obtained from the material present in the wellbore.

A baseline 404 has been superimposed through the responses 402 and indicates the average Z/A ratio of the responses 402. The responses 402 are bounded by an upper data envelope line 406 and a barite response boundary 408. The upper data envelope line 406 is located based on a pre-determined standard deviation. The barite response boundary 408 is located based on the same pre-determined standard deviation value as the upper data envelope line 406. Responses obtained from a majority of typical wellbore fluids may lie between the upper data envelope line 406 and the barite response boundary 408. Any response that may lie below or to the right of the barite response boundary 408 may be determined to be obtained from a material comprising barite.

Also illustrated are a solid-liquid phase boundary 410 and a liquid-gas phase boundary 412. The density and lithology responses 402 lying below the solid-liquid phase boundary 410 are indicative of the responses 402 being obtained from a solid (e.g., cement) material 206 in the annulus 202. The density and lithology responses 402 lying between the solid-liquid phase boundary 410 and the liquid-gas phase boundary 412 are indicative of the responses 402 being obtained from a liquid (e.g., heavier liquids such as mud and water). The density and lithology responses 402 lying above (or to the right of) the liquid-gas phase boundary 412 are indicative of the responses 402 being obtained from a gaseous material 206 in the annulus 202. As seen in FIG. 4A, there is no indication of the presence of barite or gas in the cross plot 400 since there are no response lying to the right of the liquid-gas phase boundary 412 (indicative of presence of gas) and below the barite response boundary 408 (indicative of presence of barite).

The responses obtained by the near spectral density detector generally come from the region of the wellbore 104 (FIGS. 2 and 3A) dominated by liquids. Accordingly, evaluation methods may use the responses obtained by the near spectral density detector as a borehole fluid response indicator in interpretation efforts. On the other hand, the responses obtained by the far spectral density detector may extend deeper through the casing 108 and the space occupied by the annulus 202, along with some effects emanating from the formation 106.

As mentioned above, measurements from the existing pad-mounted spectral density logging tool are acquired only from a sector of the wellbore and the pad-mounted spectral density logging tool cannot acquire data from the entire circumference of the wellbore. On the contrary, the circumferential spectral density logging tool 214 (FIG. 2), according to one or more embodiments disclosed herein, can acquire data from the entire circumference of the wellbore. The measurements obtained by the circumferential spectral density logging tool 214 may be the same as or similar to the measurements as acquired by the existing pad-mounted spectral density logging tool. However, because the circumferential spectral density logging tool 214 measures the entire circumference of the wellbore 104, the measurements taken at a location in the wellbore 104 are indicative of the compositional equivalent of the materials 206 (FIG. 2) in the entire circumference of the wellbore 104 at that location and not just in a sector of the wellbore.

In some embodiments, response ratios obtained from the dual spaced neutron tool 216 may also be used to help determine and otherwise refine the compositional equivalent of the material 206. More particularly, a ratio (RATN) of calibrated far neutron detector 318b count rates (FDSN) and calibrated near neutron detector 318a (FIG. 3B) count rates (NDSN) may be used to determine a relative hydrogen index for the environment of the wellbore 104.

The neutron ratio RATN obtained while performing a logging operation in the downhole direction (tool string 114 being run toward the toe of the well) may be graphically depicted on the plot 400 in accordance with a color/shade-coded scale 414. The color or shading of the responses 402 may be indicative of the hydrogen content for the detected material. Compositions having a higher hydrogen content, for example mud, will have lower RATN on the color/shade index scale 414, while a lower hydrogen content will fall in higher RATN on the color/shade index scale 414. Cement and gas, for example, exhibit a low hydrogen index, while drilling muds and brines typically exhibit large amounts of hydrogen. Accordingly, there may be a visible correlation between the hydrogen index and the compositional equivalent of the material 206 (FIG. 2), such as its phase, and the color or shading of the responses 402 may provide the visual indicator on the plot 400. Accordingly, utilizing calibrated counts for the generalized responses for different tool models may prove advantageous in providing more consistent responses.

Figure 4B:
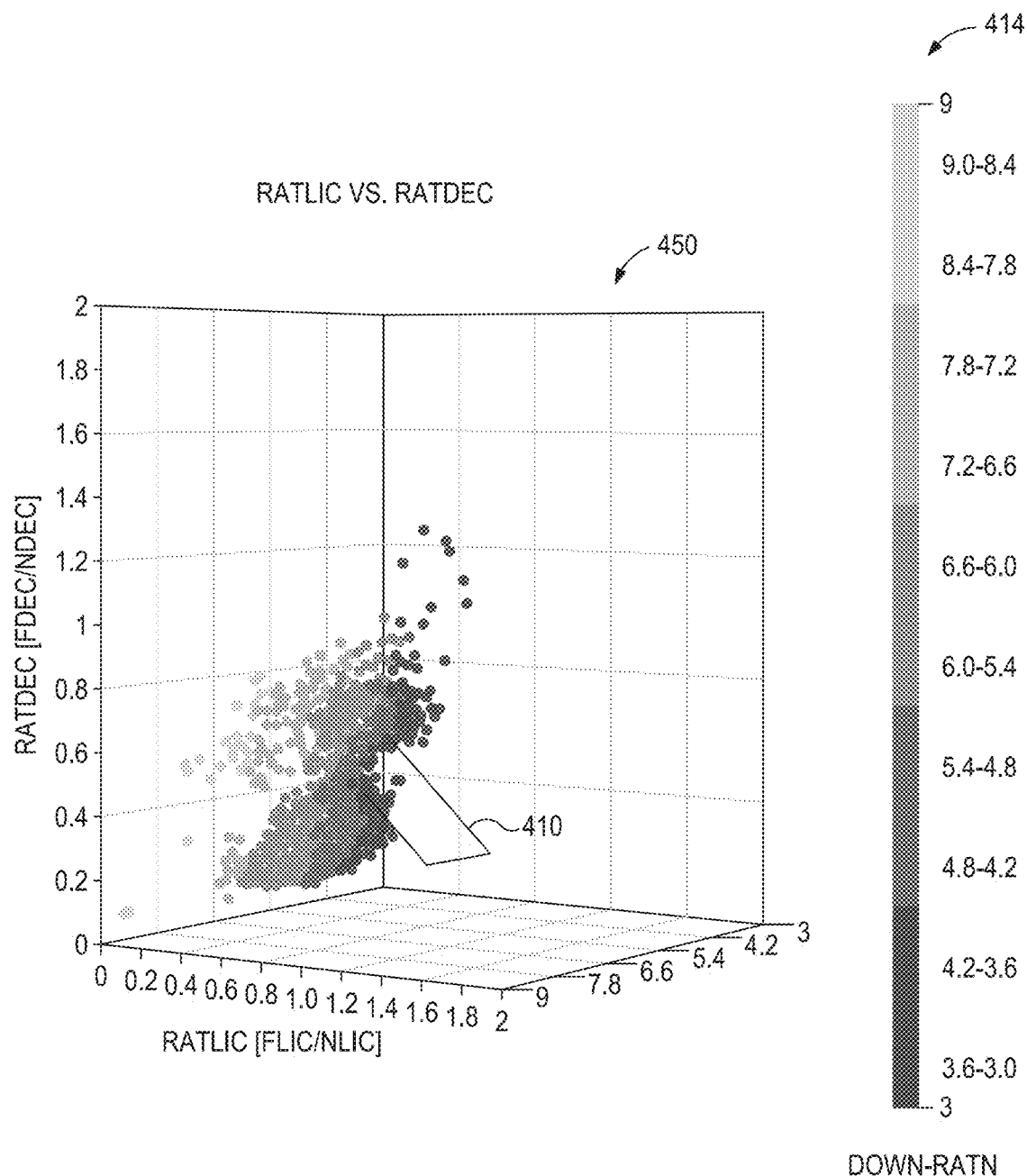
FIG. 4B is a 3-dimensional (3-D) cross plot corresponding to the 2-D cross plot of FIG. 4A.

FIG. 4B is a 3-dimensional (3-D) cross plot 450 corresponding to the 2-D cross plot 400 of FIG. 4A. For the sake of clarity of illustration, the lines 404, 406, 408, and 412 are not illustrated in FIG. 4B. In FIG. 4A, because the cross plot 400 represents density and lithology responses 402 in 2-D, some of the responses 402 that are not visible (e.g., due to overlap) in the cross plot 400 may be visible in the 3-D cross plot 450. For instance, the 3-D cross plot 450 may visibly depict the darker color responses 402 (top of the scale 414) indicating a relatively higher neutron ratio RATN that is representative of the presence of solids. The 3-D cross plot 450 more clearly depicts the variation in the data from a solid to a pure liquid.

Log analysts using the presently described methods of interpretation and modeling may be able to generate and evaluate results before the tool string 114 (FIGS. 1 and 2) is returned to surface. The presently disclosed methods allow distinction between cement, barite (and similar heavy mineral drilling fluid weighting materials), settled solids, gases, and drilling mud from which there is, at times, precipitated solids segregation, which previous methods relying on acoustic and ultrasonic measurement alone were not able to accurately identify. The entire circumferential measurement obtained using the circumferential spectral density logging tool 214 (FIG. 2) is similar to the measurements provided by the dual spaced neutron tool 216 (FIG. 2) and the circumferential acoustic scanning tool 212 (FIG. 2). As a result, the measurements obtained by the circumferential spectral density logging tool 214, the dual spaced neutron tool 216, and the circumferential acoustic scanning tool 212 are obtained from the entire circumference of the wellbore 104, and thus it is relatively easier to interpret these measurements. Further, varying the axial separation between the near and far spectral density detectors 306a,b, the standoff distance between the radioactive source 304 and the inner wall of the casing 108, and the standoff distance between the near and far spectral density detectors 306a,b and the inner wall of the casing 108 optimizes the density measurements for various logging environments.

In some embodiments, a behind pipe evaluation technique (BPET) answer product or "deliverable" may be generated and otherwise derived from the various interpreted logging tool responses discussed herein. The BPET deliverable, for example, may be computed and generated using the surface computer 126 (FIG. 1) of the logging facility 122 (FIG. 1), or with any other computing device or facility with access to the logging tool responses. The BPET results may be displayed (e.g., as two-dimensional or three-dimensional images) on a graphical user interface or any other format capable of displaying or providing the results for consideration. In some embodiments, the BPET deliverable may include and graphically display evaluation results taken from some or all of the cement bond logging tool 210, the circumferential acoustic scanning tool 212, the circumferential spectral density logging tool 214, the dual spaced neutron tool 216, and any other tool (or sensor) included in the tool string 114 (FIG. 2).

In other embodiments, when one or more other types of logging tools (see above) are included in the tool string 114, the BPET deliverable may include and graphically display evaluation results obtained from some or all of these other logging tools in combination with the evaluation results from some or all of the cement bond logging tool 210, the circumferential acoustic scanning tool 212, the circumferential spectral density logging tool 214, and the dual spaced neutron tool 216. In at least one embodiment, the BPET deliverable may further include a composite log derived from measurements obtained from the cement bond logging tool 210, the circumferential acoustic scanning tool 212, the circumferential spectral density logging tool 214, the dual spaced neutron tool 216, and any other tool (or sensor) included in the tool string 114. The composite log may collectively indicate the measurements obtained from the logging tools included in the tool string 114, as opposed to a single log that indicates the measurements from a single logging tool. The BPET deliverable may also include interpretation highlights that identify intervals of interest, historical results, and possible recommendations on proceeding, such as preferred locations to cut the casing 108 for a cut and pull operation. In some embodiments, the BPET deliverable may further include an interpretation and evaluation legend providing rig operation recommendations and solutions.

Examples disclosed herein include:

A. A method that includes introducing a tool string into a wellbore at least partially lined with casing and having a material disposed in an annular region surrounding the casing, wherein the tool string comprises a plurality of logging tools including a cement bond logging tool, a circumferential acoustic scanning tool, a circumferential spectral density logging tool, and a dual spaced neutron logging tool; obtaining acoustic refracted waveform measurements of the material using the cement bond logging tool; obtaining ultrasonic measurements of the material using the circumferential acoustic scanning tool; obtaining gamma radiation measurements scattered from the material using the circumferential spectral density logging tool, the gamma radiation measurements obtained by emitting gamma radiation from a first radioactive source positioned in a rotating portion of the circumferential spectral density logging tool while rotating the rotating portion and detecting the gamma radiation scattered by the material using a near spectral density detector and a far spectral density detector positioned in the rotating portion; obtaining thermal neutron radiation measurements scattered from the material using the dual spaced neutron logging tool having a second radioactive source, a near neutron detector, and a far neutron detector; collecting the measurements obtained by the plurality of logging tools with a computer; and generating with the computer a deliverable that includes one or more cross plots that identify a compositional equivalent of the material in an entire circumference of the wellbore.

B. A wellbore logging system that includes a tool string extendable within a wellbore at least partially lined with a casing and having a material disposed in an annular region surrounding the casing, wherein the tool string comprises a plurality of logging tools including a cement bond logging tool that obtains acoustic refracted waveform measurements of the material; a circumferential acoustic scanning tool that obtains ultrasonic measurements of the material; a circumferential spectral density logging tool having a rotating portion including a first radioactive source, a near spectral density detector, and a far spectral density detector positioned therein, wherein circumferential spectral density logging tool obtains gamma radiation measurements by emitting gamma radiation from the first radioactive source while rotating the rotating portion and detecting the gamma radiation that is scattered by the material using the near and far spectral density detectors; and a dual spaced neutron logging tool having a second radioactive source, a near neutron detector, and a far neutron detector, wherein the near and far neutron detectors obtain thermal neutron radiation measurements scattered from the material; a computer communicably coupled to the plurality of logging tools and including a non-transitory, computer-readable medium readable by a processor and storing instructions that when executed by the processor cause the computer to obtain the measurements from the plurality of logging tools; and a deliverable generated by the computer and including one or more cross plots that identify a compositional equivalent of the material in an entire circumference of the wellbore.

Each of examples A and B may have one or more of the following additional elements in any combination: Element 1: further comprising optimizing an axial separation between the near and the far spectral density detectors. Element 2: further comprising optimizing a standoff distance between the first radioactive source and an inner wall of the casing. Element 3: further comprising optimizing a standoff distance between an inner wall of the casing and one or both of the near spectral density detector and the far spectral density detector. Element 4: wherein the annular region is an annulus defined between the casing and the wellbore. Element 5: wherein the casing comprises two or more strings of casing that overlap each other or are concentrically-positioned, and the annular region is an annulus defined between two of the two or more strings of casing. Element 6: wherein the one or more cross plots depict: responses based on a density ratio of count rates based on density response versus a lithology ratio of count rates based on lithology response as well as other portions of measured density spectrums and ratios thereof; and a coded hydrogen index scale of the responses based on a ratio of far neutron detector and near neutron detector count rates. Element 7: determining a location to cut the casing based on the compositional equivalent of the material identified from the one or more cross plots; and performing a cut and pull operation to remove the casing from the wellbore. Element 8: further comprising: calibrating count rates of the near and far spectral density detectors and the near and far neutron detectors against a common standard to obtain calibrated count rates; and using the calibrated count rates to plot responses on the one or more cross plots. Element 9: wherein the deliverable further includes a composite log derived from the measurements obtained from the cement bond logging tool, the circumferential acoustic scanning tool, the circumferential spectral density logging tool, and the dual spaced neutron logging tool. Element 10: further comprising processing the acoustic refracted waveform measurements by referencing peaks and troughs of waveforms obtained by the cement bond logging tool. Element 11: further comprising determining a phase of the material based on density and lithology ratios as well as the other measured portions of density spectrums and their associated ratios.

Element 12: wherein the circumferential spectral density logging tool varies an axial separation between the near and far spectral density detectors. Element 13: wherein the circumferential spectral density logging tool varies a standoff distance between the first radioactive source and an inner wall of the casing. Element 14: wherein the circumferential spectral density logging tool varies a standoff distance between an inner wall of the casing and one or both of the near spectral density detector and the far spectral density detector. Element 15: wherein the one or more cross plots depict: responses based on a density ratio of count rates for the near and far spectral density detectors based on density response versus a lithology ratio of count rates for the near and far spectral density detectors based on lithology response as well as other portions of measured density spectrums; and a coded hydrogen index scale of the responses based on a ratio of far neutron detector and near neutron detector count rates. Element 16: wherein the computer is a surface computer arranged at a surface location and the tool string is communicably coupled to the surface computer via a cable that conveys the tool string into the wellbore. Element 17: wherein the compositional equivalent of the material comprises one of a gas, a liquid, a settled mud solid, and cement. Element 18: wherein count rates of the near and far spectral density detectors and the near and far neutron detectors are calibrated against a common standard to obtain calibrated count rates. Element 19: wherein the deliverable further includes a composite log derived from the measurements obtained from the cement bond logging tool, the circumferential acoustic scanning tool, the circumferential spectral density logging tool, and the dual spaced neutron logging tool.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
   introducing a tool string into a wellbore at least partially lined with casing and having a material disposed in an annular region surrounding the casing, wherein the tool string comprises a plurality of logging tools including a cement bond logging tool, a circumferential acoustic scanning tool, a circumferential spectral density logging tool, and a dual spaced neutron logging tool;
   obtaining acoustic refracted waveform measurements of the material using the cement bond logging tool;
   obtaining ultrasonic measurements of the material using the circumferential acoustic scanning tool;
   obtaining gamma radiation measurements scattered from the material using the circumferential spectral density logging tool, the gamma radiation measurements obtained by emitting gamma radiation from a first radioactive source positioned in a housing of a rotating portion of the circumferential spectral density logging tool while rotating the rotating portion and detecting the gamma radiation scattered by the material using a near spectral density detector and a far spectral density detector positioned in the rotating portion, wherein the first radioactive source is moveable in a cavity from the longitudinal axis of the circumferential spectral density logging tool toward an outer surface of the housing;
   obtaining thermal neutron radiation measurements scattered from the material using the dual spaced neutron logging tool having a second radioactive source, a near neutron detector, and a far neutron detector;
   collecting the measurements obtained by the plurality of logging tools with a computer; and
   generating with the computer a deliverable that includes one or more cross plots that identify a compositional equivalent of the material in an entire circumference of the wellbore.

2. The method of claim 1, further comprising optimizing an axial separation between the near and the far spectral density detectors.

3. The method of claim 1, further comprising optimizing a standoff distance between the first radioactive source and an inner wall of the casing.

4. The method of claim 1, further comprising optimizing a standoff distance between an inner wall of the casing and one or both of the near spectral density detector and the far spectral density detector.

5. The method of claim 1, wherein the annular region is an annulus defined between the casing and the wellbore.

6. The method of claim 1, wherein the casing comprises two or more strings of casing that overlap each other or are concentrically-positioned, and the annular region is an annulus defined between two of the two or more strings of casing.

7. The method of claim 1, wherein the one or more cross plots depict:
responses based on a density ratio of count rates based on density response versus a lithology ratio of count rates based on lithology response as well as other portions of measured density spectrums and ratios thereof; and
a coded hydrogen index scale of the responses based on a ratio of far neutron detector and near neutron detector count rates.

8. The method of claim 1, further comprising:
determining a location to cut the casing based on the compositional equivalent of the material identified from the one or more cross plots; and
performing a cut and pull operation to remove the casing from the wellbore.

9. The method of claim 1, further comprising:
calibrating count rates of the near and far spectral density detectors and the near and far neutron detectors against a common standard to obtain calibrated count rates; and
using the calibrated count rates to plot responses on the one or more cross plots.

10. The method of claim 1, wherein the deliverable further includes a composite log derived from the measurements obtained from the cement bond logging tool, the circumferential acoustic scanning tool, the circumferential spectral density logging tool, and the dual spaced neutron logging tool.

11. The method of claim 1, further comprising processing the acoustic refracted waveform measurements by referencing peaks and troughs of waveforms obtained by the cement bond logging tool.

12. The method of claim 1, further comprising determining a phase of the material based on density and lithology ratios as well as the other measured portions of density spectrums and their associated ratios.

13. A wellbore logging system, comprising:
a tool string extendable within a wellbore at least partially lined with a casing and having a material disposed in an annular region surrounding the casing, wherein the tool string comprises a plurality of logging tools including:
a cement bond logging tool that obtains acoustic refracted waveform measurements of the material;
a circumferential acoustic scanning tool that obtains ultrasonic measurements of the material;
a circumferential spectral density logging tool having a rotating portion including a first radioactive source disposed in a housing of the rotating portion, wherein the first radioactive source is moveable in a cavity from the longitudinal axis of the circumferential spectral density logging tool toward an outer surface of the housing, a near spectral density detector, and a far spectral density detector positioned therein, wherein circumferential spectral density logging tool obtains gamma radiation measurements by emitting gamma radiation from the first radioactive source while rotating the rotating portion and detecting the gamma radiation that is scattered by the material using the near and far spectral density detectors; and
a dual spaced neutron logging tool having a second radioactive source, a near neutron detector, and a far neutron detector, wherein the near and far neutron detectors obtain thermal neutron radiation measurements scattered from the material;
a computer communicably coupled to the plurality of logging tools and including a non-transitory, computer-readable medium readable by a processor and storing instructions that when executed by the processor cause the computer to obtain the measurements from the plurality of logging tools; and
a deliverable generated by the computer and including one or more cross plots that identify a compositional equivalent of the material in an entire circumference of the wellbore.

14. The wellbore logging system of claim 13, wherein the circumferential spectral density logging tool varies an axial separation between the near and far spectral density detectors.

15. The wellbore logging system of claim 13, wherein the circumferential spectral density logging tool varies a standoff distance between the first radioactive source and an inner wall of the casing.

16. The wellbore logging system of claim 13, wherein the circumferential spectral density logging tool varies a standoff distance between an inner wall of the casing and one or both of the near spectral density detector and the far spectral density detector.

17. The wellbore logging system of claim 13, wherein the one or more cross plots depict:
responses based on a density ratio of count rates for the near and far spectral density detectors based on density response versus a lithology ratio of count rates for the near and far spectral density detectors based on lithology response as well as other portions of measured density spectrums; and
a coded hydrogen index scale of the responses based on a ratio of far neutron detector and near neutron detector count rates.

18. The wellbore logging system of claim 13, wherein the computer is a surface computer arranged at a surface location and the tool string is communicably coupled to the surface computer via a cable that conveys the tool string into the wellbore.

19. The wellbore logging system of claim 13, wherein the compositional equivalent of the material comprises one of a gas, a liquid, a settled mud solid, and cement.

20. The wellbore logging system of claim 13, wherein count rates of the near and far spectral density detectors and the near and far neutron detectors are calibrated against a common standard to obtain calibrated count rates.

21. The wellbore logging system of claim 13, wherein the deliverable further includes a composite log derived from the measurements obtained from the cement bond logging tool, the circumferential acoustic scanning tool, the circumferential spectral density logging tool, and the dual spaced neutron logging tool.

* * * * *